US005974419A

United States Patent [19]

Ashby

[11] Patent Number: 5,974,419

[45] Date of Patent: Oct. 26, 1999

[54] PARCELIZATION OF GEOGRAPHIC DATA FOR STORAGE AND USE IN A NAVIGATION APPLICATION

[75] Inventor: Richard A. Ashby, Blue River, Wis.

[73] Assignee: Navigation Technologies Corporation, Rosemont, Ill.

[21] Appl. No.: 08/924,328

[22] Filed: Sep. 5, 1997

Related U.S. Application Data

[63] Continuation-in-part of application No. 08/740,295, Oct. 25, 1996, and application No. 08/740,298, Oct. 25, 1996.

[51] Int. Cl.[6] .......................................... G06F 17/36

[52] U.S. Cl. .......................... 707/100; 707/104; 701/200; 701/201; 701/202; 701/209; 340/990; 340/995; 340/996

[58] Field of Search .................................... 707/100, 104; 701/200, 201, 202, 209; 340/990, 995, 996

[56] References Cited

U.S. PATENT DOCUMENTS

| | | | |
|---|---|---|---|
| 4,630,209 | 12/1986 | Saito et al. | 701/201 |
| 4,888,698 | 12/1989 | Driessen et al. | 701/200 |
| 4,937,572 | 6/1990 | Yamada et al. | 340/995 |
| 5,036,471 | 7/1991 | Tamura et al. | 701/209 |
| 5,168,452 | 12/1992 | Yamada et al. | 701/202 |
| 5,170,353 | 12/1992 | Verstraete | 701/202 |
| 5,285,391 | 2/1994 | Smith, Jr. et al. | 701/200 |
| 5,406,493 | 4/1995 | Goto et al. | 701/200 |
| 5,592,665 | 1/1997 | Lahaije | 707/4 |
| 5,754,846 | 5/1998 | Janse et al. | 707/100 |

OTHER PUBLICATIONS

Frosh, Randy, "A Method of Accessing Large Spatial Databases", Nov. 26–30, 1989, GIS/LIS '89 Conference, Orlando, Florida.

Samet, Hanan, "Strategies for Optimizing the Use of Redundancy in Spatial Databases", Chapter 2.4, The Design and Analysis of Spatial Data Structure, ISBN 0–201–50255–0; (before 1996).

Bentley, Jon L, "Multidimensional Binary Search Trees in Data Applications", IEEE Transactions on Software Engineering, vol. SE–5, No. 4, Jul. 1979, pp. 333–340.

*Primary Examiner*—Paul R. Lintz
*Attorney, Agent, or Firm*—Frank J. Kozak; Lawrence M. Kaplan

[57] ABSTRACT

A system and method for arranging and storing a plurality of records of geographic data, wherein each record corresponds to a physical feature having a physical location in a geographic region. The method and system comprise arranging the records of geographic data into a plurality of parcels. Each parcel includes records of geographic data that represent features having physical locations encompassed within a corresponding associated rectangular area located in the geographic region. The size and location of each such rectangular area associated with a parcel is determined by a series of divisions of a bounding rectangle that encompasses all of the features represented by the plurality of records into further rectangular areas. Each division, subsequent to an initial division, is made on a rectangular area resulting from the preceding division. Each such division of a rectangular area is made at a location along the rectangular area based upon an assessment of one or more trial divisions of the rectangular area at one or more locations. A division is selected based upon a comparison of the quantities of data encompassed by the rectangular area and each of the further rectangular areas formed by the one or more trial divisions. The assessment is based upon a comparison of these quantities of data for each such trial division to a plurality of ranges of acceptable data quantities. These acceptable sizes are derived from a desired fill percentage of parcels with data.

20 Claims, 7 Drawing Sheets

LAYER 0 ROUTING DATA BEFORE FINAL SPLIT:

SPLIT CREATING TWO LAYER 0 ROUTING PARCELS:

NEW DATA TYPE: FIRST CUT OF BOTTOM RECTANGLE CAN BE AT ANY OF SEVEN POSITIONS:

NEXT CUT AT BOTTOM RIGHT CAN BE AT ANY OF FIVE POSITIONS:

PARCELIZATION OF GEOGRAPHIC DATA FOR STORAGE AND USE IN A NAVIGATION APPLICATION

REFERENCE TO RELATED APPLICATIONS

The present application is a continuation-in-part of Ser. No. 08/740,295 and Ser. No. 08/740,298, both filed Oct. 25, 1996, both now pending, the entire disclosures of which are incorporated by reference herein.

BACKGROUND OF THE INVENTION

The present invention relates to a system and method for facilitating access to and use of geographic data used with a navigation application program that provides navigating features and functions to a user, and more particularly, the present invention relates to a method and system for organization, storage and retrieval of geographic data that facilitates use of the geographic data for various navigating functions provided by a navigation application program.

Computer-based navigation application programs are available that provide users with various navigating functions and features. For example, some navigation application programs are able to determine an optimum route to travel by roads between locations. Using input from a user, and optionally from equipment that can determine one's physical location (such as a GPS system), a navigation application program can examine various routes between two locations to determine an optimum route to travel from a starting location to a destination location in a geographic region. The navigation application program may then provide the user with information about the optimum route in the form of instructions that identify the maneuvers required to be taken by the user to travel from the starting location to the destination location. If the navigation system is located in an automobile, the instructions may take the form of audio instructions that are provided along the way as the user is traveling the route. Some navigation application programs are able to show detailed maps on computer displays outlining routes to destinations, the types of maneuvers to be taken at various locations along the routes, locations of certain types of features, and so on.

In order to provide these and other navigating functions, the navigation application program requires one or more detailed databases that include data which represent physical features in a geographic region. The detailed database may include data representing the roads and intersections in a geographic region and also may include information about the roads and intersections in a geographic region, such as turn restrictions at intersections, speed limits along the roads, the locations of stop signs, street names of the various roads, address ranges along the various roads, and so on.

Several of the navigation functions provided in a navigation system may require access to the geographic data spatially. One way this arises is that a function in a navigation application program requires finding a record, such as a data entity, in a geographic database given the physical location in the geographic region of the geographic feature represented by the data entity. The data entity may be a road segment record that represents a portion of a road in the geographic region and the function may require finding the road segment record based upon the physical location in the geographic region of the portion of the road represented by the road segment record. Another way spatial access arises is when a function in a navigation application program requires finding several or all of a type of data records located close to a location in the geographic region or within a defined area in the geographic region. For example, a function may require all road segment records encompassed within a rectangle defined by geographical coordinates (x, x+n) latitude and (y, y+m) longitude.

The map display function is a function of the type that may access geographic data spatially. The map display function may display a selected portion of the geographic region on a display screen. In order to generate such a map from a collection of database entities (or records) that represent portions of roadways in the geographic region, it is typically required to load into memory all of the road segment data entities corresponding to the portions of roadways in the selected portion of the geographic region. The data entities corresponding to the portions of roadways in the selected portion of the geographic region may need to be accessed from the data storage medium upon which the geographic database for the entire region is stored. If the road segment data entities corresponding to the selected portion of the geographic region which is desired to be displayed are located at various places on the storage medium on which the geographic database is stored, a large number of disk accesses might be required to obtain all the necessary records. This can result in relatively poor performance.

Another of the navigation functions that may be included in the navigation system is route calculation. This function provides a user of the system with an optimum route for traveling from one location in a geographic area to a destination location. In order to determine the optimal route, the route calculation function requires access to road segment data entities to determine certain data attributes, such as speed limits, turn restrictions, and so on, associated with the road segment data entities along the various possible routes between the starting location and the destination location. As with the map display function, mentioned above, the route calculation function requires access to road segment records spatially, i.e. based on the locations of the portions of the roadways in the geographic area to which the data entity records correspond. For example, as part of the route calculation procedure, when the route calculation function determines the optimum road to take from an intersection, it may access all the roads that lead from the intersection. Thus, all the road segment records that represent portions of roadways that meet at the intersection are accessed and examined. Like the map display function, the route calculation function requires that the road segment records be accessed by locations in the geographic area of the roadways to which they correspond.

Another function provided by navigation systems is maneuver generation. This function provides the user of the navigation system with instructions for traveling from one location to a destination location, based upon the optimum route calculated by the route calculation function. Given a list output from by the route calculation function that identifies the road segment records corresponding to portions of roadways for traveling from one location in the geographic region to a destination location in the geographic region, the maneuver generation function provides the user with a series of maneuver instructions. As part of the maneuver generation function, the names of the roads are found that correspond to the road segment records identified in the list calculated by the route calculation function. Depending on the way the information is stored in the geographic database, it may be necessary to access the road segment records based on the locations of the portions of roadways which they represent to identify the corresponding locations in the geographic database that includes the names of the roads in order to provide the maneuver instructions.

As demonstrated above, these functions in a navigation application program, and possibly other functions in navigation systems, require accessing data records spatially, i.e. based on the locations of the features in the geographic region to which the records correspond. Further, as suggested by the above examples, some functions in a navigation application program may require accessing a group of data records that correspond to features in a geographic area that are spaced together relatively closely in the geographic region.

Assuming that all the data records for a given entire geographic region cannot be loaded into memory at the same time due to limited memory resources of the navigation system in which the navigation application program is being run, it would be desirable to load into memory only those data that are needed. Since some of the navigation functions require accessing data spatially, it would be advantageous to provide a means to load data into memory based generally upon the physical geographic locations of the features which the data represent or upon the geographical proximity of the features which the data represent.

SUMMARY OF THE INVENTION

To address the above concerns, the present invention provides a way to organize and store data so that they are organized in the database and/or on a medium based the geographic locations of the features which are represented by the data. Accordingly, there is provided a system and method for arranging and storing a plurality of records of geographic data, wherein each record corresponds to a physical feature having a physical location in a geographic region. The method and system comprise arranging the records of geographic data into a plurality of parcels. Each parcel includes records of geographic data that represent features having physical locations encompassed within a corresponding associated rectangular area located in the geographic region. The size and location of each such rectangular area associated with a parcel is determined by a series of divisions of a bounding rectangle that encompasses all of the features represented by the plurality of records into further rectangular areas. Each division, subsequent to an initial division, is made on a rectangular area resulting from the preceding division. Each such division of a rectangular area is made at a location along the rectangular area based upon an assessment of one or more trial divisions of the rectangular area at one or more locations. A division is selected based upon a comparison of the quantities of data encompassed by the rectangular area and each of the further rectangular areas formed by the one or more trial divisions. The assessment is based upon a comparison of these quantities of data for each such trial division to a plurality of ranges of acceptable data quantities. These acceptable sizes are derived from a desired fill percentage of parcels with data.

DETAILED DESCRIPTION OF THE PRESENTLY PREFERRED EMBODIMENTS

I. General

In one present embodiment, the speed and/or functionality of a navigation system can be enhanced by a combination that includes improvements in the storage, arrangement, and/or structuring of the geographic data used by the system to facilitate the use of the data by some of the functions in the navigation application program in the system that use the data. Based upon the manner in which the geographic data are stored, arranged, and/or structured, functions in the navigation application program that access the data can implement routines that exploit the improvements incorporated into the geographic data. This combination can result in overall improved performance by the navigation system.

Figure 1:
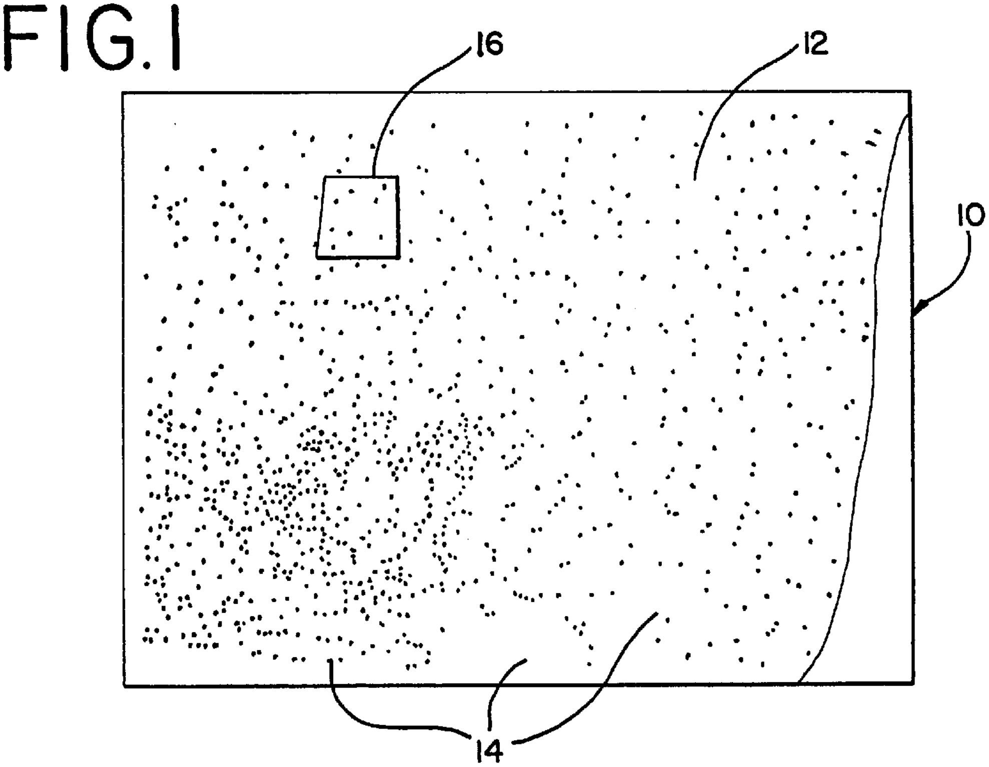
FIG. 1 illustrates a map showing a geographic region.
Figure 2:
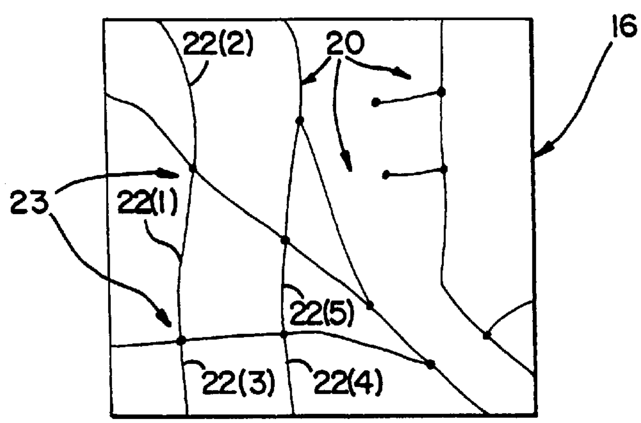
FIG. 2 shows an expanded view of a portion of the map of FIG. 1.
Figure 3:
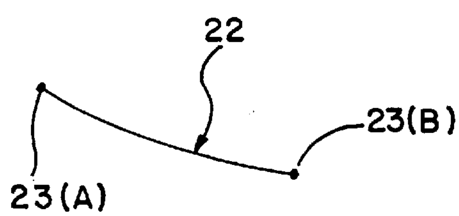
FIG. 3 is an illustration of a single road segment shown in the map of FIG. 2.

FIG. 1 illustrates a map 10 showing a geographic region 12 and FIG. 2 shows an expanded view of a portion 16 of the map 10. The portion 16 in FIG. 2 illustrates part of the road network 20 in the geographic region 12. The road network 20 includes, among other things, roads and intersections located in the geographic region 12. As shown in FIG. 2 in the illustrated portion 16 of the map each road in the geographic region 12 is composed of one or more segments, 22(1), 22(2) . . . 22(*n*). In one embodiment, a road segment represents a portion of the road. In FIG. 2, each road segment 22 is shown to have associated with it two nodes 23: one node represents the point at one end of the road segment and the other node represents the point at the other end of the road segment. A single road segment 20 and its two associated nodes 23(A) and 23(B) are illustrated in FIG. 3. The node at either end of a road segment may correspond to a location at which the road meets another road, e.g. an intersection, or where the road dead ends. (An intersection may not necessarily be a place at which a turn from one road to another is permitted, but represents a location at which one road and another road have the same latitude and longitude.)

In one type of geographic database, there is at least one database entry (also referred to as "entity" or "record") for each road segment in a geographic region. This road segment data record may have associated with it information (such as "attributes", "fields", etc.) that allows identification of the nodes associated with the road segment and/or the geographic positions (e.g. the latitude and longitude coordinates) of the two nodes. In addition, the database road segment record may have associated with it information (e.g. more "attributes", "fields", etc.), that speciy the speed of travel on the portion of the roadway represented by the road segment record, the direction of travel permitted on the road portion represented by the road segment record, the name of the road represented by the road segment record, what if any turn restrictions exist at each of the nodes which correspond to intersections at the ends of the road portion represented by the road segment record, street address ranges of the roadway represented by the road segment record, and so on.

Several navigation application functions require identification of a road segment data record based upon the physical location of the portion of the road in the geographic region which is represented by the road segment data record. Therefore, the geographical position of the portion of the road represented by the road segment data record is associated with the database entity for the road segment data record. In one embodiment, the location of the road segment is identified by the positions of its nodes. By convention or design, one of the two nodes associated with the road segment may be used to identify the location of the road segment, although both nodes or some other arrangement may be employed. The road segment data record may have associated with it attribute information that allows identification of its nodes.

In a geographic database that represents the region 12, there may also be a database entry (entity or record) for each node in the geographic region. The node data record may have associated with it information (such as "attributes", "fields", etc.) that allows identification of the road segment (s) that connect to it and/or its geographic position (e.g. the latitude and longitude coordinate).

Referring again to the map of FIG. 1, a plurality of locations 14 are shown to be located in the geographic region 12. Each of the locations 14 represents a place or point in the geographic area 12 at which there is located a feature about which it is desired to include information in a geographic database. Each of these locations 14 has a unique physical location (latitude, longitude, and optionally absolute or relative altitude) and each of the locations 14 can be uniquely identified by its two dimensional (or three dimensional) geographic coordinates, (i.e., latitude, longitude, and optionally altitude). A location 14 may correspond to one of the nodes located at the end of road segment data entity, or may correspond to a point-of-interest, such as a hotel or civic center, or may correspond to a point along a road segment at which the direction of the road changes. The locations 14 may represent anything physically located in the geographic area 12.

a. Separate subsets of data

One way that the accessing of geographic data can be enhanced for performing various navigation functions is to provide separate collections or subsets of the geographic data for use by each of the separate functions in the navigation application program. Each of these separate subsets is tailored specifically for use by one of the functions. For instance, the route calculation function normally uses only a portion of all the information in the geographic database that is associated with a segment of a road. For example, when the route calculation function is being run, it may require information such as the speed of travel along a road segment, turn restrictions from one road segment to another, stop lights at intersections of road segments, and so on. However, the route calculation function does not normally require the name of the road to calculate an optimum route. Similarly, when using the map display function, some of the information associated with a road segment, such as the speed limits or turn restrictions, is not required. Instead, when the map display function is run, it uses only a portion of the information associated with the road segment, such as the shapes and locations of roads, and possibly the names of the roads. Even further, when the maneuver function is being run, some of the information associated with a segment of a road, such as the speed and turn restrictions, is not required. Instead, when the maneuver function is being run, it uses information that includes the name of the road represented by the road segment data entity, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

Figure 4:
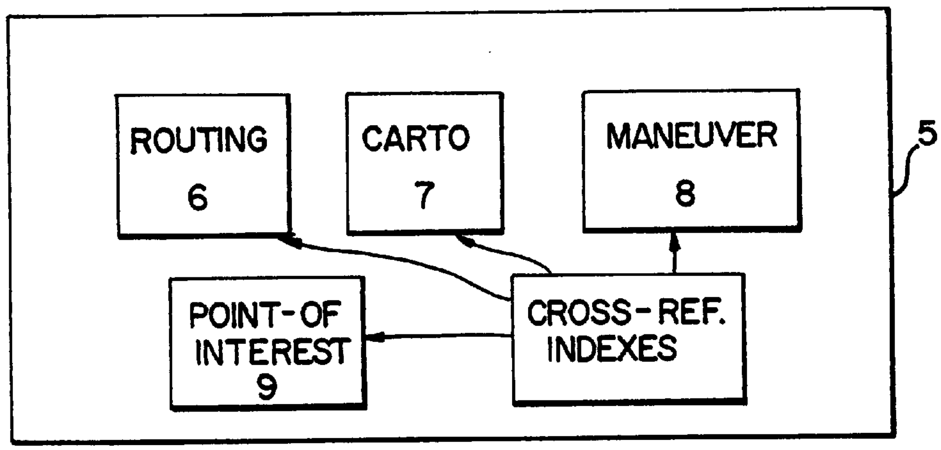
FIG. 4 is a diagram illustrating a geographic database for the geographic region illustrated in FIG. 1 and having separate subsets of data for use with navigation application programs.

In order to provide the information in the geographic database in a format more efficient for use by each of the navigation functions, separate subsets of the entire geographic database for a given geographic region are provided for each of the different types of navigation functions to be provided in the navigation application program. FIG. 4 illustrates a geographic database 5 comprised of separate routing data 6, cartographic data 7 (for map display), maneuver data 8, and points-of-interest data 9. A geographic database may be defined with fewer or more subsets than these, and other types of data may be defined and included.

Each subset of data includes only the data required to be used by a particular navigation function. There is some overlap of data between each of these subsets, with the result that some parts of the information may be included in more than one subset. For example, both the road segment data entity in the routing data subset as well as the road segment data entity in the cartographic data subset may include attributes identifying the nodes located at the ends of the segments. Although this duplication may result in an larger overall data storage requirement, each of the navigation programs benefits from the resultant efficiency of handling smaller amounts of data.

Providing for separate subsets of geographic data for each of the navigation programs also takes into account that usage of each of these navigation functions relates to the others of the navigating functions in expected ways. For example, a user will often first want to view a present position, then enter a destination, then receive instructions how to start toward the destination, then observe a map showing the initial portion of the route, then receive further instructions, then have a map displayed of the next portion of the route, and so on. Because of these type of expected usages, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, in the example mentioned above, after a user obtains a calculated route, it may be desired to display a map on a computer display with the calculated route highlighted. In order to accomplish this, the routing subset of geographic data is accessed first to obtain the routing road segment data entities for the optimum route, and then the cartographic subset of the geographic database is accessed to obtain the cartographic road segment data entities corresponding to the routing data entities. To permit these data subsets to work together, cross referencing indexes 11 may be provided, or other search techniques may be provided.

b. Layering of data

Another way that the geographic data can be organized to enhance their use is to provide the data in layers. Some of the navigation functions use the data at different levels of detail. The map display function is an example of this type of function. When using the map display function, it is sometimes desired to provide for panning and zooming. Zooming can be done more efficiently if the data are organized into layers, with greater detail at the lower layers and less detail at the higher layers. When using the route calculation function, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data, the geographic data are provided in separate collections or groups corresponding to separate layers.

Figure 5:
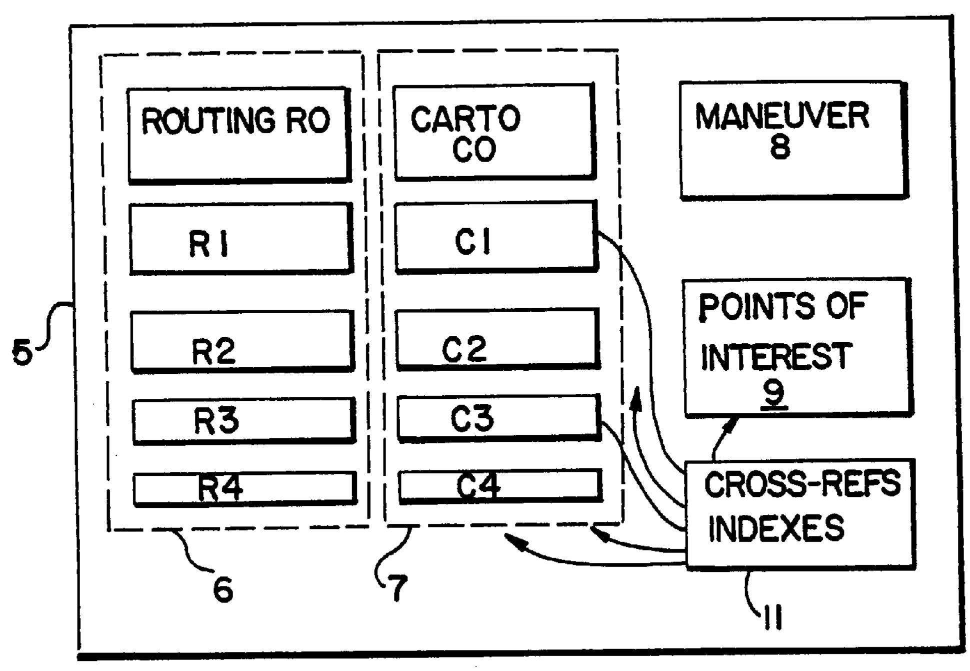
FIG. 5 is a diagram similar to FIG. 4 illustrating both separate subsets of data types and separate layers of data in some of the types.

To implement layering, data entities, such as road segment data entities, are provided with a "rank". The "rank" of a road segment may be related to its functional class with road segments having a rank of "0" being slowest and narrowest, road segments having a rank of "1" being larger and faster, road segments having a rank of "2" being major roads, and so on. The "rank" of a segment data entity also specifies the highest data layer in which a road segment entity exists. For example, referring to FIG. 5, the route calculation subset of geographic data 6 may include five separate collections of the data, R0, R1, R2, R3, and R4, each with a different level of detail, which can be used by the route calculation function. Similarly, the cartographic (i.e., map display) subset of geographic data 6 may include five separate collections of the data, C0, C1, C2, C3, and C4, each with a different level of detail, which can be used by the map display.

In the routing subset of the geographic database, layer 0 (R0) includes segment data entities corresponding to all the portions of all the roads in the geographic region. Level 1 of the routing data comprises a separate subset (or collection) of the routing data and includes only the routing segment data entities (and their corresponding routing data attributes) having a rank of level 1 or higher. Level 2 of the routing data comprises a separate subset of the routing data and includes only the routing segment data entities (and their corresponding navigation data attributes) having a rank of level 2 or higher, and so on.

Similarly, the cartographic subset of geographic data may include separate collections (layers) of the data used by the map display function, each with a different level of detail. In the cartographic subset of the geographic data base, layer 0 includes segment data entities (and corresponding data attributes) corresponding to all the portions of all the roads in the geographic region. Level 1 of the cartographic data comprises a separate subset of the cartographic data and includes only the cartographic segment data entities (and corresponding data attributes) having a rank of level 1 or higher, and so on. Using these different layers of cartographic data, the map display function can provide rapid panning and zooming.

Although the organization of some of the data into layers results in a duplication of some of the data, the increased efficiency provided by layering of some of the data generally offsets any disadvantages. As with the use of separate types of data mentioned above, the need arises to allow these layers to work together. Cross referencing indexes 11 may be provided, or other search techniques may be provided.

II. Parcelization and spatial access

Organizing the data into subsets or types and layering the data of some of the types provides separate collections of the data in sizes that are more manageable by each of the navigation functions. With respect to each subset and each layer of data, the data can be further organized to facilitate spatial access.

It is desired to store data representing roads and intersections based upon the physical proximity of the geographic physical features that they represent. In order to accomplish this, data are organized into parcels with each parcel of data including data which represent features which are located physically proximate to each other in the geographic region. As described further below, each parcel of data includes data which represent physical features encompassed within a geographic area of a size, shape, and position determined by the parcelization procedure. A parcel of data is established to be the smallest quantity of data that can be accessed at a time. This may relate to the quantity of data that can be accessed efficiently in a single disk access, although it may be related to some other factor. For some types of media such as a CD-ROM, a parcel may be established to a 16 Kilobyte quantity of data. (Other sizes of data may be used including 1 K, 2 K, 4 K, 8 K, 32 K, and so on.)

(For purposes of forming the data into parcels, the data are first separately organized into the different types, as described above, based upon the functions that access them, such as routing, map display, and maneuver generation. Further, the data are also organized into layers, as mentioned above, based upon rank. Therefore, this description of parcelization refers to the level 0 routing data although it is applicable to other types and levels of data as well.)

Parcelizing data spatially requires determining the size, shape, and position of the geographic areas which encompass the data which form each parcel. In general, regular shapes, such as squares and rectangles, are preferred for the geographic areas from which parcels are formed. Since some parts of a geographic region are more densely featured than other parts, if all the parcels were formed of data that represented geographic features encompassed within rectangular areas of the same size, many of the parcels would be much less filled with data than other parcels. This is an undesirable condition since it wastes disk storage space and does not provide the navigation application program that uses the geographic database with as many data records as possible with each disk access.

a. Parcelization disclosed in Ser. No. 08/740,295

A parcelization procedure that results in a relatively high fill percentage of data in parcels is disclosed in Ser. No. 08/740,295, filed Oct. 25, 1996, the entire disclosure of which is incorporated by reference herein. The parcelization method is briefly described as follows.

The parcelization method described in the referenced application uses both a normal bisecting procedure and a special dividing procedure to parcelize the data. In general, starting with an initial rectangle (which may be either a bounding rectangle that encompasses the entire geographic region or one of a plurality of uniformly-sized rectangles defined by a grid overlaid on the bounding rectangle), the rectangle is examined first to determine whether the data it encompasses are less than a maximum size for formation of a parcel, and second if the data it encompasses are less than a predetermined multiple of the maximum size for formation of a parcel. If the rectangle encompasses data which are less than the maximum parcel size for formation of a parcel, a parcel is formed of the data encompassed by the initial rectangle. If the initial rectangle encompasses data which are greater than the predetermined multiple of the maximum parcel size, the initial rectangle is bisected into two sub-rectangles, each of which is examined in the same manner as the initial rectangle and each of which in turn is bisected if the data representing the features encompassed therein are greater than the predetermined multiple of the maximum parcel size. Thus, the rectangles are bisected into two equal sized sub-rectangles until a rectangle is formed that encompasses data less than the predetermined multiple of the maximum parcel size (but more than a maximum size for formation of a parcel). At this point, the rectangle is divided using a special division procedure that increases the likelihood that the parcels formed will have a desired fill percentage.

When data representing the features encompassed in a rectangle are less than a predetermined multiple of the maximum parcel size (but more than a maximum size for formation of a parcel), trial divisions of the rectangle are examined at locations in addition to a division by bisection. In one embodiment, divisions are examined at ½ along the rectangle (i.e. a bisection), ¼ along the rectangle, ¾ along the rectangle, ⅛ along the rectangle, ⅜ along the rectangle, and so on, through 31/32 along the rectangle. A division is selected so that further divisions will result in the minimum number of parcels being formed of the data.

As mentioned above, the parcelization procedure from the referenced application, Ser. No. 08/740,295, may start with a rectangle that encompasses the entire geographic region, or preferably, it starts with a plurality of starting rectangles defined by a regular grid which is overlaid on the entire geographic region. Such a grid is formed so that a starting rectangle is the largest rectangle allowed such that the data representing the features encompassed therein are permitted to form a parcel. Using a regular grid to define starting rectangles facilitates parcelization since it is unlikely that any of the first several divisions of a rectangle encompassing the entire region will form rectangles small enough to form a parcel. Thus, overlaying a grid represents several bisections of the entire region.

Figure 6:
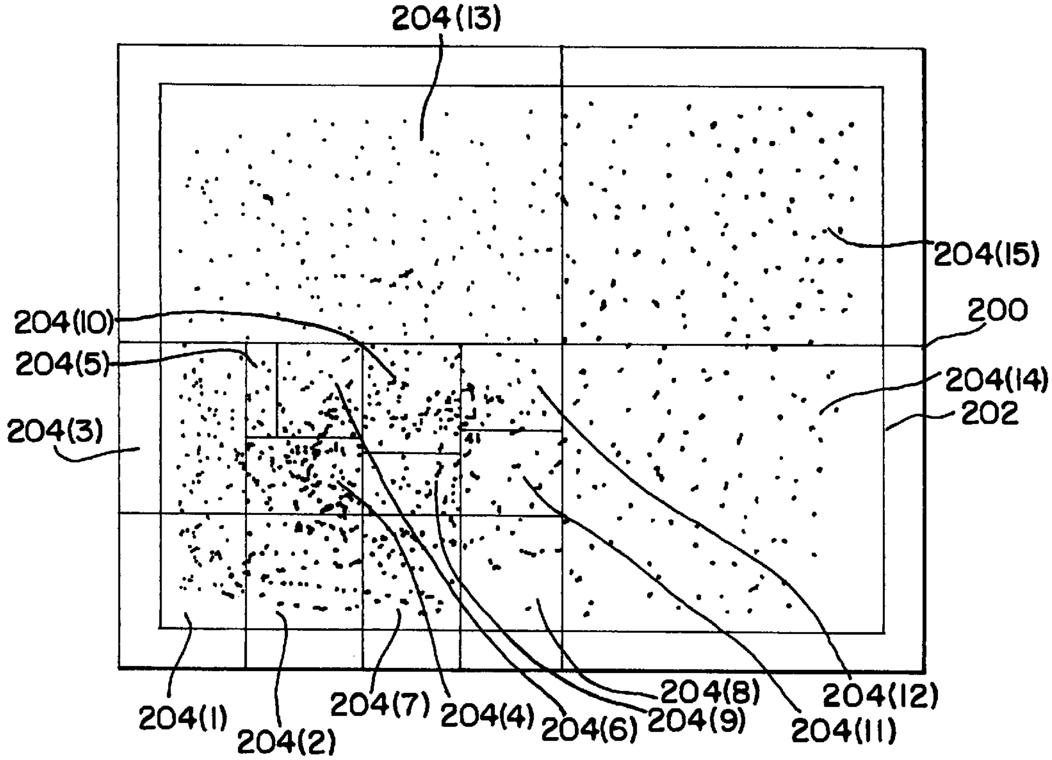
FIG. 6 shows the map of a geographic region illustrating a parcelization method.

This parcelization procedure uses a minimum enclosing dividable-tile ("di-tile") for purposes of determining the point at which a division of any rectangle (or sub-rectangle) is made. Referring to FIG. 6, in this parcelization method, a minimum enclosing di-tile 200 is determined that encompasses a minimum bounding rectangle 202. A di-tile refers to an area of dimensions $2^I \times 2^J$ that includes all map data between latitudes $M \times 2^I$ navigation units and $(M+1) \times 2^I$ navigation units and between navigation units, where M and N are integers, and I and J are positive integers). The navigation units 1, 2, . . . an so on, may represent units equal to 1/100,000th of a degree. (To allow di-tiles to overlap "0", i.e. latitude or longitude equal to "0", di-tiles may also have dimensions between $-2^I, +2^I$, where $I \geqq 17$.)

One way of determining a minimum enclosing di-tile is to define acceptable intervals and to require that the minimum enclosing di-tile have as its sides only acceptable intervals. Acceptable intervals are defined in both directions of latitude and longitude. (Any arbitrary starting location may be chosen, but in a preferred embodiment, acceptable intervals conform to conventional latitude and longitude starting locations, i.e. the equator and Greenwich.) Acceptable intervals may be defined to include only powers of 2, for example: 0–1, 2–3, 4–5, 6–7, . . . , 0–3, 4–7, 8–11, 12–15, . . . , 0–7, 8–15, 16–23, 24–31, . . . , 0–15, 16–31, 32–47, 48–63, . . . , and so on (in navigation units). Acceptable intervals include $\{M*2^I, (M+1)*2^I\}$ where $M \in Z$ (where M is a member of the set of all integers Z), $I \geqq 0$; or acceptable intervals may also include $\{-2^I, +2^I\}$ where $I \geqq 17$ in order to obtain intervals that overlap latitude or longitude equal to 0.

In this embodiment, the sides of the minimum enclosing di-tile for the minimum enclosing rectangle are required to be acceptable intervals. Therefore, in this embodiment, the east-west coordinates of the initial di-tile are multiples of $2^I$ units, and the north-south coordinates of the initial di-tile are multiples of $2^J$ units. (I and J are integers so that the east-west length of the initial di-tile may have a dimension in units of 1, 2, 4, 8, 16, 32, 64, 128, 256, 512, or 1024, and so on, and the north-south length of the initial di-tile may have a dimension in units of 1, 2, 4, 8, 16, 32, 64, 128, 256, 512, or 1024 and so on, for example).

Once the minimum enclosing di-tile is established, the data can be parcelized. In one alternative, the parcelization process can begin by applying the regular division procedure, described below, to the minimum enclosing di-tile. Alternatively, the data in the coverage area are first examined based upon an organization of the data into a regular grid of rectangles formed from the minimum enclosing di-tile. This is equivalent to bisecting the minimum enclosing di-tile and then the rectangles (or squares) formed therefrom a number of times until a regular grid of rectangles results. Each of the rectangles in this grid may be referred to as an "initial tile" (corresponding to the "starting rectangle", above) The initial tile size is determined to be the largest geographic area allowed to be represented by one parcel at any layer of any of the types of data in the geographic database. In one embodiment, one fixed initial tile size is defined for all regions throughout the country so that regions can be more easily merged. In one present preferred embodiment, each of the initial tiles is of a fixed, predetermined size of $2^{17}$ navigation units by $2^{17}$ navigation units.

The placement of the boundaries of the grid is determined in order to include the region of the minimum bounding rectangle ("MBR") within a minimum enclosing di-tile. The MBR is the rectangle formed by the north-south line through the minimum longitude (corresponding to the easternmost node encompassed in the geographic region), the east-west line through the minimum latitude (corresponding to southern-most node encompassed in the geographic region), the east-west line through the maximum latitude (corresponding to northernmost node encompassed in the geographic region), and the north-south line through the maximum longitude (corresponding to the westernmost node encompassed in the geographic region). The grid boundaries are defined so as to correspond to the minimum enclosing di-tile when the grid is overlaid on the region. All the spatial data are encompassed and the initial tiles have a size as described above. In a preferred embodiment, the placement of the grid boundaries also conforms to the acceptable intervals, described above.

As mentioned above, a purpose of parcelizing the data is to include in each parcel an amount of data that is close as possible to, but not in excess of, a predetermined maximum parcel amount. For example, the predetermined maximum amount may be 16 Kilobytes.

Each one of the initial tiles in the grid is examined as a "trial parcel" to see if the amount of data in it fits into a single parcel. If the data within the "trial parcel", including any parcel overhead (such as index information and headers), would (accounting for data compression, if used) be less than or equal to the maximum parcel amount, then a parcel is constructed with that initial tile and no division of that initial tile for that particular data type is performed. On the other hand, any "trial parcel" that includes an amount of data that exceeds the predetermined maximum parcel amount is divided using one of the two following procedures as a function of the amount by which the data in the "trial parcel" exceeds the desired maximum amount. (In a preferred embodiment, an estimation technique, described below, is used in determining trial parcels. The estimation technique takes into account parcel overhead and compression without actually performing all the steps necessary to form a parcel.)

Regular dividing procedure. If the amount of data in a "trial parcel" exceeds the maximum parcel amount by a predetermined multiple, the "trial parcel" is divided into two rectangles. In a preferred embodiment, the division of the "trial parcel" into two rectangles is carried out by first determining the minimum enclosing di-tile for the trial parcel (in the manner described above with the initial tile), bisecting the enclosing di-tile, and then dividing the "trial parcel" where the line of bisection of the di-tile intersects the trial parcel. Alternatively the "trial parcel" may itself simply be bisected. (It is noted that a bisection of the enclosing di-tile will not always bisect the trial parcel, but instead may divide the trial parcel at an off-center location. For ease of reference herein, such division of the trial parcel will nonetheless be referred to as "bisection"). In either event, the line of bisection of the di-tile will be in either the longitudinal or latitudinal direction. In a one embodiment, the di-tile is bisected in whichever of the longitudinal or latitudinal divisions minimizes the maximum aspect ratio of the two resulting rectangles of the trial parcel.

Each of these resulting rectangles is then examined as a "trial parcel", as described above, and bisected if the data contained in it exceeds a predetermined multiple of the maximum parcel amount. Each of these sub-rectangles is also then examined as a "trial parcel", as described above, and the process continues until the amount of data in a rectangle or sub-rectangle is less than the predetermined multiple of the maximum parcel amount. The predetermined multiple is chosen based upon a desired minimum fill percentage for each parcel. In one embodiment the desired minimum fill percentage is 80% and the predetermined multiple is 3.2 which can be derived from the following table (where D is an unacceptable data size and P is the maximum parcel size):

TABLE

| |
|---|
| $0 < D < 0.8 \times P$ |
| $P < D < 1.6 \times P$ |
| $2 \times P < D < 2.4 \times P$ |
| $3 \times P < D < 3.2 \times P$ |

The list stops at this point, because the next entry would be the empty range $4\times P<D<4\times P$.

In one embodiment, the maximum parcel amount is predetermined to be 16 Kilobytes of data. (In alternative embodiments, the maximum amount may be predetermined to be another amount greater than or less than 16K, such as 8K or 32K, or even amounts greater or less than these). Thus, "trial parcels" are bisected according to the regular procedure when their data content exceeds 51.2 kilobytes. When the amount of data in any trial parcel is less than the predetermined multiple amount, further subdivisions of the trial parcel follow the "custom division procedure", described below.

Custom division procedure. If the amount of data in any "trial parcel" exceeds the maximum parcel amount, but is less than the predetermined multiple of the maximum parcel amount (e.g., 16 Kb<x51.2 Kb), the following custom division procedure is used: Further divisions of the "trial parcel" are not necessarily bisections, but rather are made in a manner that tends to minimize the number of parcels created. This has the effect of minimizing both the space needed to store the parcels and wasted space within the parcels.

For example, given a trial parcel that contains data equal to 3.6 times the maximum parcel size or amount, it should be possible to fit this data into four parcels. However, bisection of the trial parcel may divide it into two rectangles of 1.2 times the maximum parcel size and 2.4 times the maximum parcel size, respectively, which would then end up in a minimum of five parcels if bisection were used to divide each of the rectangles. Therefore, subdivisions of the rectangle at this stage are made with the goal of minimizing the number of parcels created, but with the restriction that the division line not be arbitrary. More particularly, where a "trial parcel" has a data content that is greater than the maximum parcel size, but not in excess of the predetermined multiple thereof, the "trial parcel" is divided at a division of $2^{-x}$ along one of its dimensions. In one embodiment, X={1, 2,3,4,5}. Thus, the trial parcel is divided at ½ or ¼ or 1⁄16 or 1⁄32 divisions of its width. For example, a trial parcel may be divided into two rectangles with widths equal to ⅝ and ⅜, respectively, of the width of the trial parcel. This custom division may be applied directly to the dimensions of the trial parcel, or, in a present preferred embodiment, it may be applied to the dimensions of, a minimum enclosing di-tile of the trial parcel. In the latter case, the trial parcel is divided where the division line of the di-tile intersects the trial parcel. In either event, the division line will be in either the longitudinal or latitudinal direction.

In the method described in the referenced application Ser. No. 08/740,295, candidate division lines are examined as follows: First, divisions are made at each of the specified $2^{-x}$ divisions along both the longitudinal and latitudinal widths of the trial parcel. For each such division, the aspect ratios (defined as the ratio of the larger dimension to the smaller dimension) of each of the two resulting rectangles are determined, and the greater of the two is identified. The greatest aspect ratios identified for each of the candidate division lines are then compared, and the candidate division lines are ordered from smallest to greatest of such aspect ratios. The rectangles resulting from the candidate division lines are then examined, beginning with the first candidate line in the ordered list. The candidate division line chosen for dividing the trial parcel is the first one in the list encountered where the data content in one of its two resulting rectangles is less than or equal to a multiple (such as two times) of the parcel site and greater than or equal to a minimum fill percentage times such amount. For example, the division line is chosen to include in one of the resultant rectangles an amount between 1.6 and 2.0 times the maximum parcel amount. This should enable making one more division of the rectangle to form two further sub-rectangles each with a fill percentage greater than 80% (0.8) of the maximum parcel amount. Each of these resultant sub-rectangles with a fill percentage between 80% and 100% of the maximum parcel amount is formed into a parcel. If no candidate division line meets this criterion, then the first candidate division line (i.e. the one with the smallest maximum aspect ratio) is used to divide the given rectangle.

Example

The following describes how, during parcelization, a determination is made when to stop bisecting trial parcels, and to start the custom procedure of evaluating candidate divisions of 1/32, 1/16, 3/32, 1/8, 5/32, 3/16, 7/32, 1/4, 9/32, 5/16, 11/32, 3/8, 13/32, 7/16, 15/32, 1/2, 17/32, 9/16, 19/32, 5/8, 21/32, 11/16, 23/32, 3/4, 25/32, 13/16, 27/32, 7/8, 29/32, 15/16, and 31/32 along both the longitudinal and latitudinal widths of the trial parcel.

A target parcel fill percentage F is chosen. For the sake of example, let F be 0.8(80 percent). As mentioned above, a maximum parcel size P is also determined. P is expressed in bytes and is the maximum amount of data that can be put into a parcel. Optimally, therefore, it is desired to create parcels in the range of F×P bytes and P bytes in size.

If a trial parcel having a data size D is in the range P<D<1.6×P, then it is not possible for parcels to be created therefrom whose data sizes fall in the target range. If the trial parcel is divided such that one resulting rectangle has a data size greater than or equal to 0.8×P, then the other one has a data size less than 0.8×P.

This process can be extended to give non-acceptable data sizes, as listed in the Table above.

From the above list a complementary list of acceptable data sizes can be generated:

| Acceptable Data Sizes D: |
|---|
| 0.8 × P ≦ D ≦ P |
| 1.6 × P ≦ D ≦ 2 × P |
| 2.4 × P ≦ D ≦ 3 × P |
| 3.2 × P ≦ D |

The above list corresponds to a fill percentage F equal to 0.8. Other fill percentages generate different lists of acceptable or unacceptable data sizes. In general, the list of unacceptable data sizes is in the following form:

| Unacceptable Data Sizes D: |
|---|
| 0 < D < F × P |
| P < D < 2 × F × P |
| . . . |
| n × P < D ≦ (n + 1) × F × P |
| . . . |
| continuing until an empty range is reached. |

The above is used as follows in the custom procedure for forming the parcels: The data sizes of each of the two rectangles resulting from a trial parcel division should fall within one of the acceptable ranges (whenever possible). In practice, this means that as long as the data size in a rectangle is somewhat larger than the high end of the highest unacceptable range (3.2×P, in the example), the rectangle can be divided according to the above-described bisection procedure. Once the high end of the highest unacceptable range is approached, custom divisions (i.e., divisions of 1/32, 1/16, 3/32, 1/8, etc. in this example) are considered.

Candidate division lines are examined and compared in the manner described above, and the one selected for division is where the following criterion is met: The amount of data falling into each of the two sub-rectangles of the trial parcel is of a size such that it is theoretically capable of, in turn, being subdivided into rectangles that, on the average, achieve a specified minimum parcel data fill percentage. Some cases may occur in which the above criterion cannot be met.

The data are divided at the division line chosen in the custom division procedure, and, for each of the two sub-rectangles created, the custom division process is repeated as necessary. As mentioned above, the bisection and custom division procedure can be applied either directly to the trial parcel or to the minimum enclosing di-tile of the trial parcel, although the latter is preferred. It is noted that in some cases the minimum enclosing di-tiles are exactly equal to trial parcel boundaries. This may occur with respect to the initial tiles. The utility of defining the divisions in terms of the minimum enclosing tiles is that a tile can be repeatedly divided in half evenly, whereas a trial parcel rectangle of arbitrary dimensions cannot. Another advantage is that this procedure facilitates processing at boundaries between different databases. The custom division of a trial parcel at a $2^{-X}$ division of the tile's side is equivalent to a sequence of from 1 to X bisections. Consequently, the division lines, and therefore the resulting sub-rectangles, can be represented in a minimal number of bits (5 bits for 1/32 divisions, as opposed to up to eight or sixteen bytes to define an arbitrary rectangle).

(In examining amounts of data included in rectangles, a convention is established that any data entity that is located exactly on a dividing line is included with the data in the rectangle "to the right" ("east") of the line, if the dividing line is a north-south line, and with the data "above" ("north of") the line, if the dividing line is an east-west line.)

The above procedure is performed on all the initial tiles (and, where necessary, all resulting rectangles) in the grid.

b. Disclosed parcelization method

The parcelization method disclosed in this application is a further improvement of the parcelization procedure described in Ser. No. 08/740,295.

In the parcelization method in the referenced application, it was proposed as an example that parcels at least 80 percent filled are desired. For a parcel size "P", a rectangle containing 2.7×P bytes of data can be divided in different ways. For example, it can be divided into two rectangles containing 1.35×P bytes of data each. Each sub-rectangle can then be divided into two sub-rectangles to obtain rectangles encompassing data less than the optimal parcel size, resulting in a total of four parcels averaging 68 percent filled. Alternatively, the initial division could be into sub-rectangles with a 1.8×P and 0.9×P bytes of data, and then the former sub-rectangle can be divided into two sub-rectangles of 0.9×P bytes each, for a total of three parcels 90 percent filled.

The decision made in this example is based on a table of acceptable data size ranges according to the following table:

TABLE 1

| Minimum | Maximum |
|---|---|
| 0.8 × P | 1.0 × P |
| 1.6 × P | 2.0 × P |
| 2.4 × P | 3.0 × P |
| 3.2 × P | — |

In the parcelization method disclosed in the referenced application, the above table is used to determine that a dividing line is acceptable based upon when it divides a rectangle into two sub-rectangles each of whose data sizes falls within one of the ranges above.

In many situations, the decision will also be constrained by the accuracy with which a data size of a parcel can be estimated before the parcel is created. If it is assumed that the data size of a rectangle can be estimated to within an accuracy of 4 percent, then to provide for parcels falling between 80 percent and 100 percent filled, without exceeding the optimum size, it is required to modify the above table to take a 4 percent error into account:

TABLE 2

| Minimum | Maximum |
|---|---|
| 0.84 × P | 0.96 × P |
| 1.68 × P | 1.92 × P |
| 2.52 × P | 2.88 × P |
| 3.36 × P | 3.84 × P |
| 4.20 × P | 4.80 × P |
| 5.04 × P | 5.76 × P |
| 5.88 × P | — |

However, in some situations dividing lines can be considered that produce sub-rectangles falling within acceptable ranges in the first table, but not the second table. Therefore, a hierarchy of two or more tables is used. In the example here, if a dividing line is found whose sub-rectangles fall within acceptable ranges in the second table, that dividing line would be selected. Otherwise, a dividing line whose sub-rectangles fell within acceptable ranges in the first table would be selected.

It could also happen that, for a particular dividing line, one sub-rectangle might be acceptable based on both the first and second tables, and the other sub-rectangle acceptable based on the first table only. Each dividing line is therefore scored as follows: each of the two sub-rectangles are scored according to the tables its data size falls into, and the score of the dividing line is defined as the sum of the two sub-rectangle scores. In this example, a dividing line both of whose resulting sub-rectangles fall into a range in the second table would score highest, and a line both of whose sub-rectangles fall into a range in the first table but not in the second table would score lowest. The best dividing line is then selected using these scores.

Aspect ratio (the ratio between the sides of a rectangle) is also taken into account, as follows: For a given dividing line, the aspect ratio of each of the two sub-rectangles is determined, and the aspect ratio for the dividing line is defined to be the least desirable (largest) of the two sub-rectangle aspect ratios. Only dividing lines whose aspect ratios are smaller than a fixed maximum aspect ratio are considered qualified candidates. Of the qualified candidates, the one with the best score will be selected.

A further refinement of this method is as follows: In some situations, it may not be possible to achieve the target fill percentage (e.g. 80–100 percent), because real-world data is too discontinuous. When this occurs, some the data sizes of some parcels will fall in the range between (0–80) percent of the optimal parcel size. Under these circumstances, it would be preferable if the parcel size were equal to the optimal percent size divided by $2^K$. If a buffer size in the memory of the navigation system is P, then it is possible to make more efficient use of buffer space if the parcel sizes are P, P/2, P/4, etc. (rather than ¾×P, ⅝×P, etc.). The reason for this is as follows: When a record size is $P/2^K$, it is more likely that a buffer slot can be found for it without rearranging other records in the cache of the memory of the navigation system. Therefore, when the data size of the rectangle being divided is less than 2×P, the tables described above are augmented with additional ranges representing the optimal parcel size divided by $2^K$, for K in the range from 1 to about 3. In the above example, the two tables would be augmented with the following ranges:

| Minimum | Maximum |
|---|---|
| First Table: | |
| 0.1 × P | 0.125 × P |
| 0.2 × P | 0.25 × P |
| 0.4 × P | 0.5 × P |
| Second Table: | |
| 0.105 × P | 0.12 × P |
| 0.21 × P | 0.24 × P |
| 0.42 × P | 0.48 × P |

In the First Table, above, acceptable ranges are defined for 80% to 100% of ⅛ times the maximum parcel size (0.1P–0.125P), 80% to 100% of ¼ times the maximum parcel size (0.2P–0.25P), and 80% to 100% of ½ times the maximum parcel size (0.44P–0.5P). In the Second Table, above, acceptable ranges are defined that take into account the approximately 4% tolerance for errors in estimating. In the Second Table, above, acceptable ranges are defined for 84% to 96% of ⅛ times the maximum parcel size (0.105P–0.12P), 84% to 96% of ¼times the maximum parcel size (0.21P–0.24P), and 84% to 96% of ½ times the maximum parcel size (0.42P–0.48P). Source code defining these tables is included in the Appendix to this specification.

This parcelization method facilitates use of the geographic data for many types of navigation functions. It also does so in a manner that results in a relatively high overall fill percentage. Thus, geographic data stored using this parcelization method are available for use in a navigation application program in parcels that have relatively many data records thereby minimizing disk accesses. In addition, because the parcels are relatively full of data (without padding), disk storage space is conserved.

Using the above procedure, after a rectangle corresponding to a first parcel is identified, the data in the remainder of the geographic region are examined. According to a preferred approach, whenever two rectangles are formed by a division, one of the rectangles is examined first based upon direction. By convention, if two rectangles are formed by a north-south division, the western-most rectangle is examined first and if two rectangles are formed by an east-west division, the southern-most rectangle is examined first. Further, rather than examining an eastern rectangle formed by a north-south division for formation of a parcel at the time the division is made, if the western rectangle encompasses data that exceeds the predetermined parcel size, further divisions of the western rectangle are conducted until all the data represented by the features in it are entirely formed into parcels before any further divisions of the eastern rectangle are made. (Similarly, rather than examining a northern rectangle formed by an east-west division for formation of a parcel at the time the division is made, if the southern rectangle encompasses data that exceeds the predetermined parcel size, further divisions of the southern rectangle are conducted until all the data represented by the features in it are entirely formed into parcels before any further divisions of the northern rectangle are made.)

Upon identification of a dividing line that forms a rectangle of a size sufficiently small so that a parcel can be formed of the data encompassed within it (in accordance with the above described criteria for parcel sizes and rectangle aspect ratios), a parcel is formed of the data encompassed by the rectangle. Then, the remaining rectangle formed by the dividing line from which the first parcel was formed is examined. This rectangle is examined because it was the last formed rectangle other than the rectangle from which a parcel was formed. This rectangle to be examined will be the rectangle formed by the last division which formed a rectangle which encompassed too much data to form a parcel.

The examination of rectangles continues in the manner described above. Each rectangle is examined and further divisions are made until small enough rectangles are formed so that parcels can be formed. As described above, the examination of rectangles proceeds in a order based on two criteria: (1) a directional preference, and (2) a priority assigned by the division that formed the rectangle. Whenever a rectangle is divided, one of the resultant rectangles has a directional preference over the other: west prior to east if the division is by a north-south line and south prior to north for an east-west line. (This directional preference is arbitrary and the alternative directions could be used, however, the directional preference should be applied consistently for a geographic region being parcelized). Any non-directionally -preferenced rectangle formed by a division is examined after the directionally-preferenced rectangle formed by the same division as well as after all rectangles formed by any subsequent divisions of the directionally-preferenced rectangle.

III. Assignment of entity ID's

Each of the different types of data (routing, cartographic, maneuver, and so on) and each layer of some of these types of data, are separately parcelized. As the parcels for each different type of data and for each different layer of data are being formed, data entity ID's are assigned. In this embodiment, data entities that are assigned data entity ID's include segment entities and node entities. Each data entity ID uniquely identifies the entity record in the geographic database and can be used to refer to a particular data record.

The method used to assign data entity ID's facilitates use of the data. Data entities are assigned ID's based upon the parcels in which they are located. Segment data entities are assigned ID's separately from node data entities; however, segment data entities and node data entities are assigned entity ID's together on a parcel by parcel basis.

Starting with the first parcel (in the order in which the parcels have been arranged), entity ID's are assigned to each segment data entity in the parcel. The entity ID's may be assigned to the segment records within a parcel in sequence order, e.g. 00000001, 00000002, 000000003, and so on, or alternatively, may be assigned in a manner such that some numbers are skipped. After all the segment records in the first parcel are assigned entity ID's, the segment records in the second parcel are assigned entity ID's. In a preferred embodiment, none of the segment ID numbers assigned to segment records contained in one parcel overlap with the segment ID's assigned to segment records in another parcel, and furthermore the entity ID's have the following binary search property: for any division line made when forming the (routing layer 0) parcels containing segments, all segment entity ID's on one side (e.g. the south or west side) are less than all segment entity ID's on the other side. For example, if 58 segment records are contained in the first parcel (such as the parcel 206(1) in FIG. 7 formed from the rectangle 204(1) in FIG. 6), and 91 segment records are contained in the second parcel (e.g. parcel 206(2) in FIG. 7 formed from the rectangle 204(2) in FIG. 6), the segment entities in parcel 206(1) may be assigned segment ID's 0000000 through 0000057, and the segment entities contained in parcel 206(2) may assigned segment entity ID's 000100 through 000190.

Within each parcel, ID's are assigned to each entity so that at least one further possible dividing line can be made to the rectangle from which the parcel is formed so that all the entity ID's on one side of the possible further dividing line are less than all the entity ID's on the other side of the dividing line. In a preferred embodiment this assignment of entity ID's to entities within a parcel is according to Peano-key order starting at one corner, such as the southwest corner. If Peano-key ordering is used, node entities are assigned node entity ID's in order by location and segment entities are assigned segment entity ID's in order based upon the location of the segment's left-most node location (or south-most if the right and left nodes have the same longitude). In an alternative embodiments, the entity ID's can be assigned in an order other than Peano key order, such as by the latitudes of the entities, or the longitudes of the entities (leftmost node of segment entities, for example). Other ordering may be used provided that the entity ID's are assigned so that there is at least one division of the entities in rectangle so that all the entity ID's south or west of the division have ID's less then all the entities on the north or east side of the division.

The parcel represents the minimum amount of data that can accessed at one time. All of the data in a parcel are loaded into the RAM of the navigation system together with the same single disk access. Therefore, accessing any one record within a parcel can be done relatively quickly.

In this embodiment, the entities are assigned entity ID's based on the order in which the parcels are formed. In a present embodiment, all the entity ID's in a first parcel are assigned ID's before any entities in the second parcel are assigned entity ID's. All the entity ID's assigned to data entities in any parcel are numerically lower than all the entity ID's in any later ordered parcel. Assignment of node entity ID's is made in a similar manner.

IV. Subsequent parcelizations

Each of the different types of data (routing, cartographic, maneuver, and so on) and each layer of some of these types of data, are separately parcelized. However, in a present embodiment, these types of data, and the layers of data of the same types, are parcelized in parallel. This means that after one type of data is parcelized, parcelization of another type of data is performed using the same i rectangle boundaries (i.e. dividing lines) that were used for the first type. It is preferred to start parcelizing the type of data expected to be most dense. A subsequent parcelization of a less dense type of data will follow the same rectangle boundaries that were used for the first type of data. However, since the second type of data may be less dense, it may be possible to form a parcel of the second type of data without making as many divisions of rectangles encompassing the features represented by the data. This would have the result that a parcel of one type of data may represent geographic features encompassed by a larger sized rectangle than a parcel of another type of data. However, whenever a division of data is to be made, it is made along the same rectangular boundary division as was made in the prior type of data.

When parcelizing one type of data after a first type of data has already been parcelized, it may sometimes occur that the subsequent type of data is more dense in a portion of the region than the first type of data which has already been parcelized. In this situation, the smallest rectangle formed by the prior parcelization of the first type of data may not be small enough for forming a parcel of data of the subsequent type. In such a situation, the subsequent type of data is further parcelized using the procedure described below.

Parcelization procedure for data types more dense than routing layer 0:

As mentioned above, node and segment entity ID's are assigned within parcels in an order so that there is at least one additional dividing line of the rectangle from which the parcel is formed so that all the entity ID's west or south of the dividing line are less than all the entity ID's east or north of the dividing line. In a preferred embodiment, Peano key ordering provides at least one such additional dividing line. In parcelizations subsequent to an initial parcelization, whenever a rectangle representing an existing parcel (of a previously created parcel type) must be divided into two or more rectangles in order to create parcels of a new type, the dividing line is chosen so that the Peano keys of all the points in the northern or eastern sub-rectangle are larger than the Peano keys of all the points in the western or southern sub-rectangle.

Figure 8A:
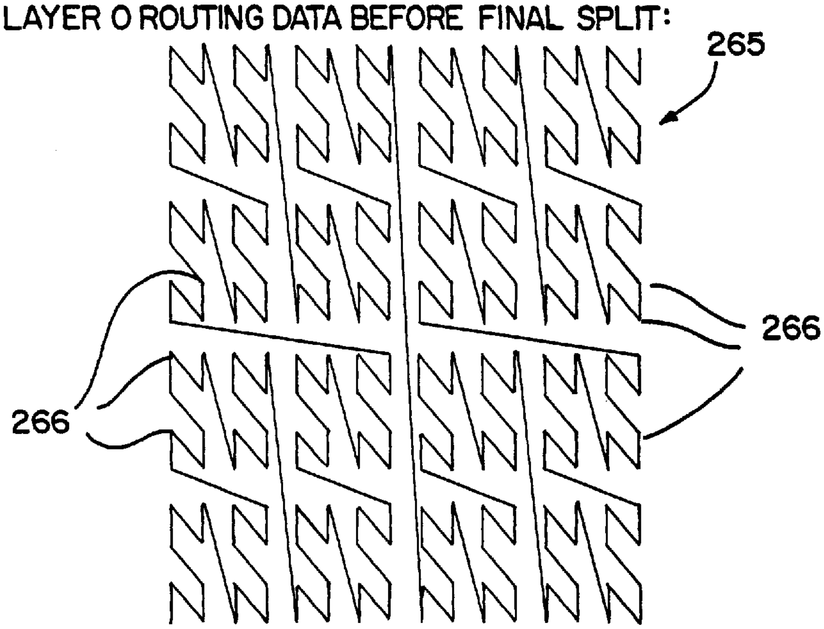
FIGS. 8A–8H are maps illustrating a process for parcelizing a type of data more dense than a previously parcelized type of data.
Figure 8B:
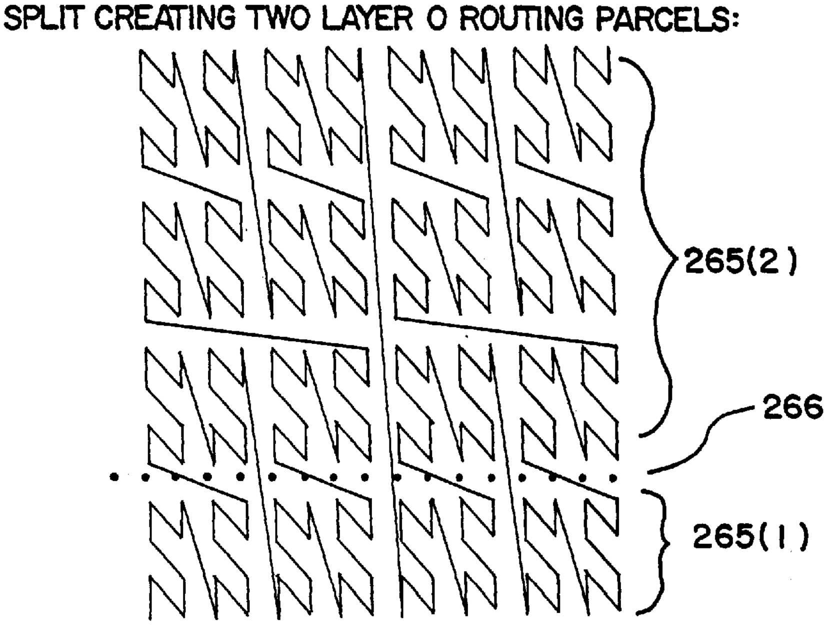

This procedure is illustrated in FIGS. 8A–8H. FIGS. 8A–8H are a set of diagrams illustrating a rectangular geographic area 265. This rectangular area 265 includes a plurality of points 266. In these diagrams, the points (equivalents to "nodes" in the geographic database) are shown linked together in Peano key order for the purpose of aiding visualization. (In an alternative embodiment, the points may be taken as representing the areas of rectangles of a grid of appropriate granularity such that each rectangle of the grid encompasses only one node in the geographic area.) The rectangular area 265 in FIG. 8A represents an area of routing layer 0 data before the final division which forms two routing layer zero parcels. FIG. 8B shows the rectangular area 265 divided into two rectangular areas 265(1) and 265(2) by a dividing line 266. Two routing layer 0 parcels are formed from the data encompassed in the two rectangles 265(1) and 265(2). As noted above, the points (nodes) are assigned entity ID's in Peano key order.

Figure 8C:
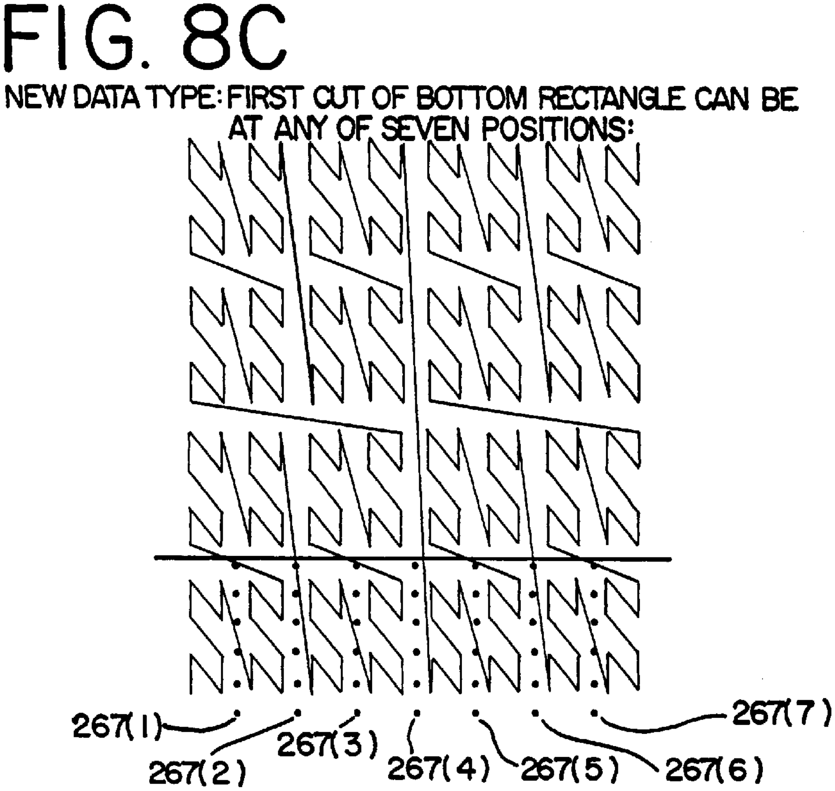
Figure 8D:
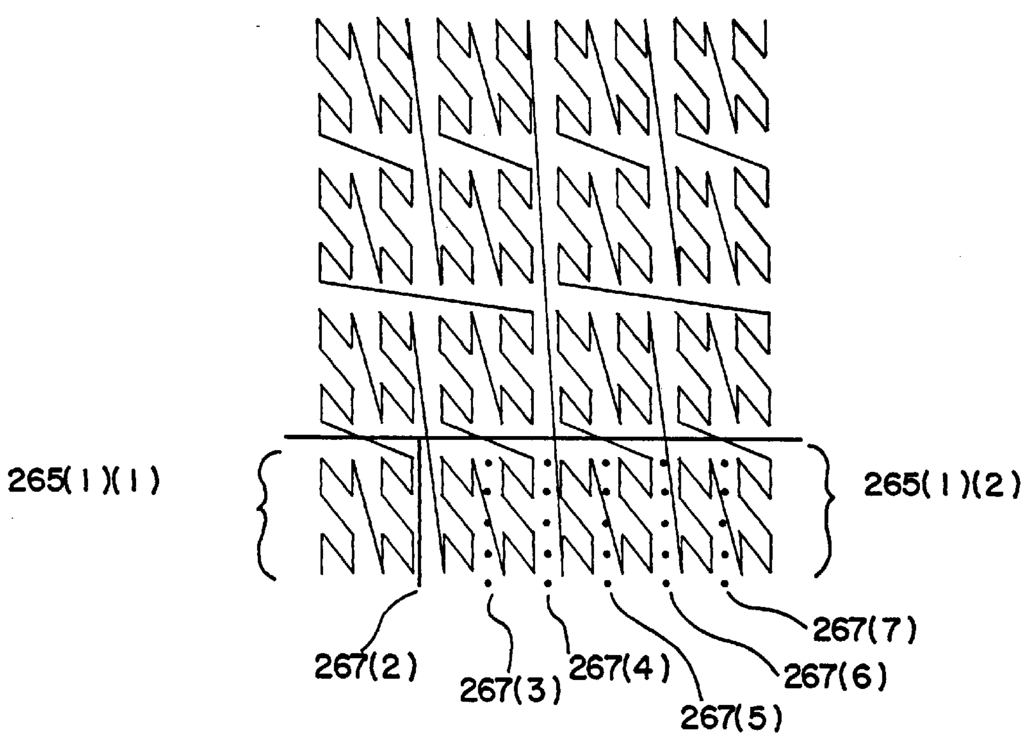

Assume that in a subsequent parcelization of a different type of data, the data encompassed in the rectangular area 265(1) is greater than the maximum parcel size and therefore the rectangular area 265(1) must be divided again. When the rectangle 265(1) is divided, the dividing line is chosen so that the Peano keys of all the points in the northern or eastern sub-rectangle are larger than the Peano keys of all the points in the western or southern sub-rectangle. It may happen (depending on the boundaries of the original rectangle) that there is only one dividing line available that meets this criterion, but sometimes there are several. In FIG. 8C, it is shown that there are seven possible positions at which another division of the rectangle 265(1) may be made. These possible divisions are labeled 267(1)–267(7). Referring to FIG. 8D, the rectangular area 265(1) is shown divided with the line at 267(2) into two sub-rectangles 265(1)(1) and 265(1)(2). If the rectangular area 265(1)(2) must be divided again, there are still five possible dividing lines, labeled 267(3)–267(7), that can be used to divide the data encompassed in rectangle 265(1)(2) and still meet the criterion that the Peano keys of all the points in the northern or eastern sub-rectangle are larger than the Peano keys of all the points in the western or southern sub-rectangle. The line 267(6) is chosen, and rectangular areas 265(1)(2)(1) and 265(1)(2)(2) are formed, as shown in FIG. 8E.

Figure 8E:
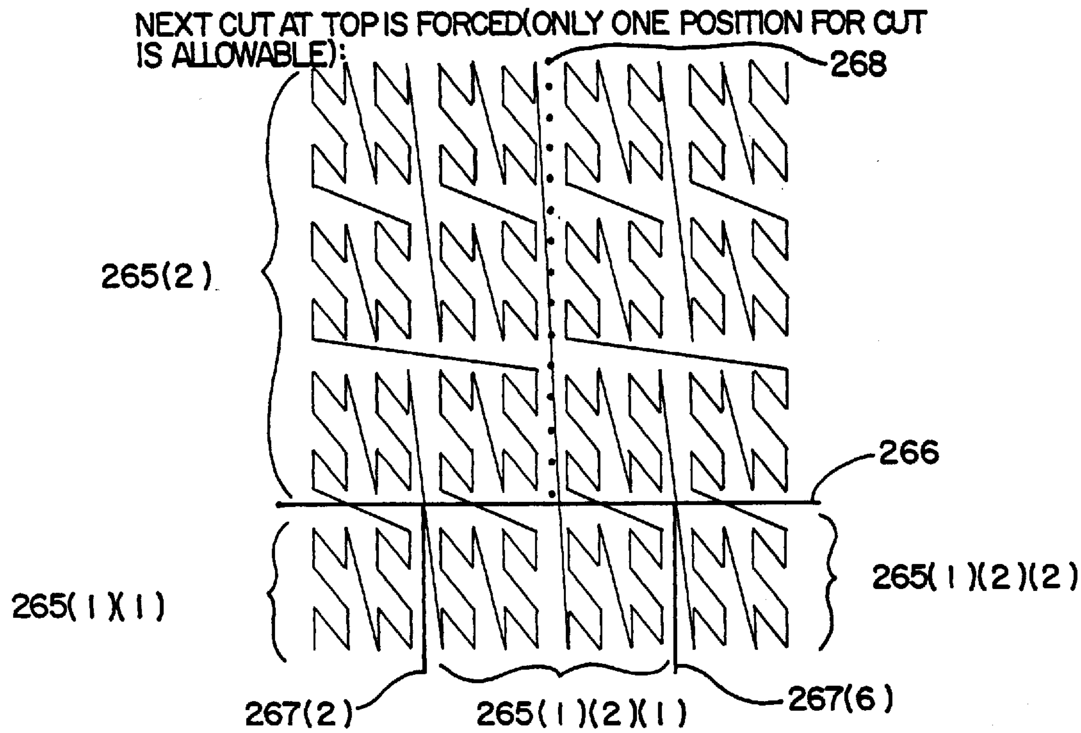
Figure 8F:
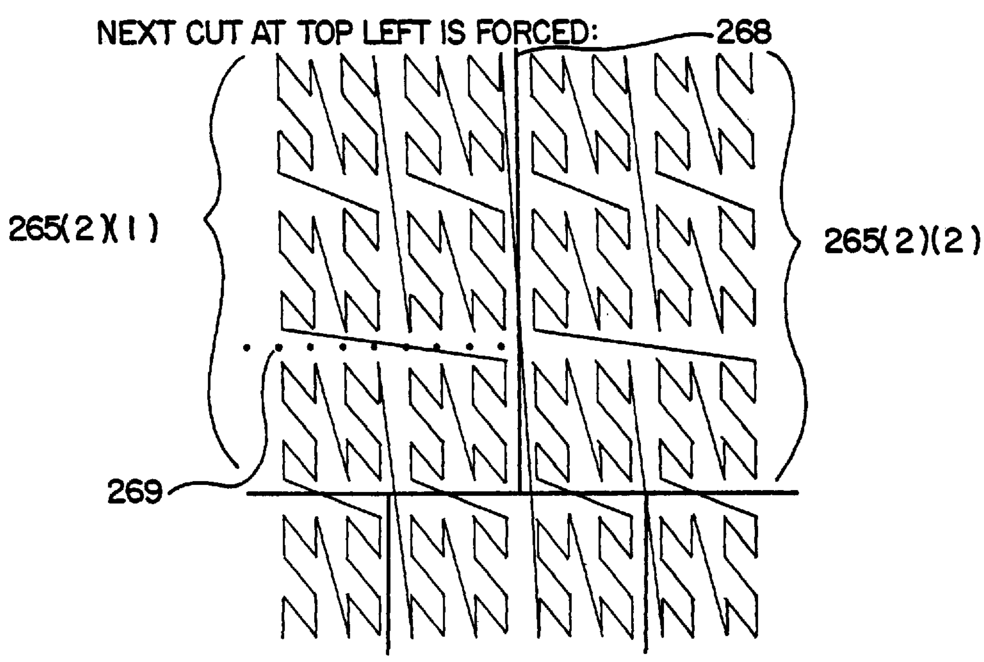
Figure 8G:
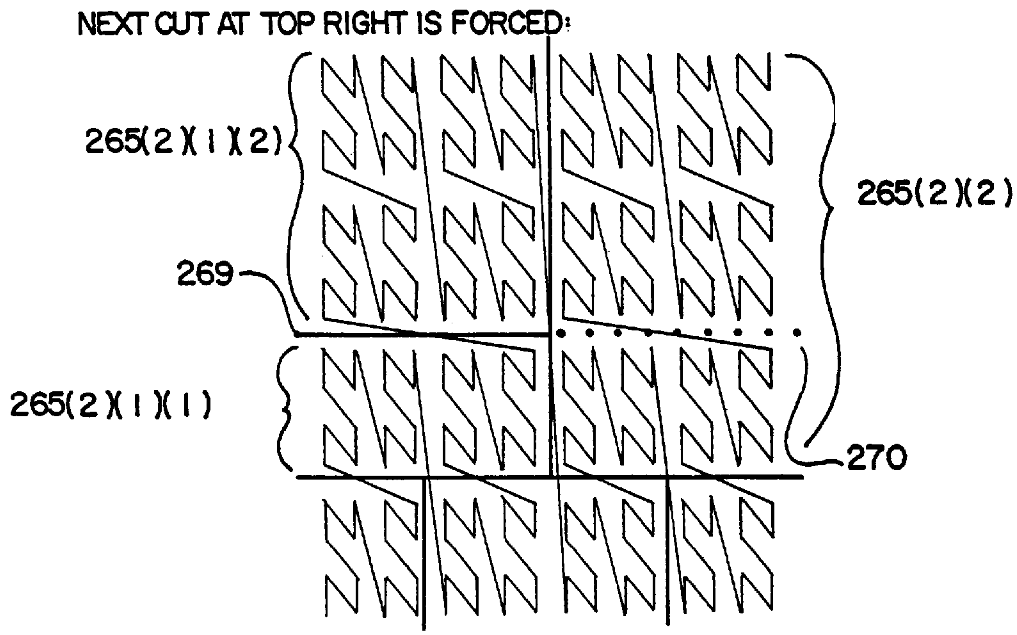
Figure 8H:
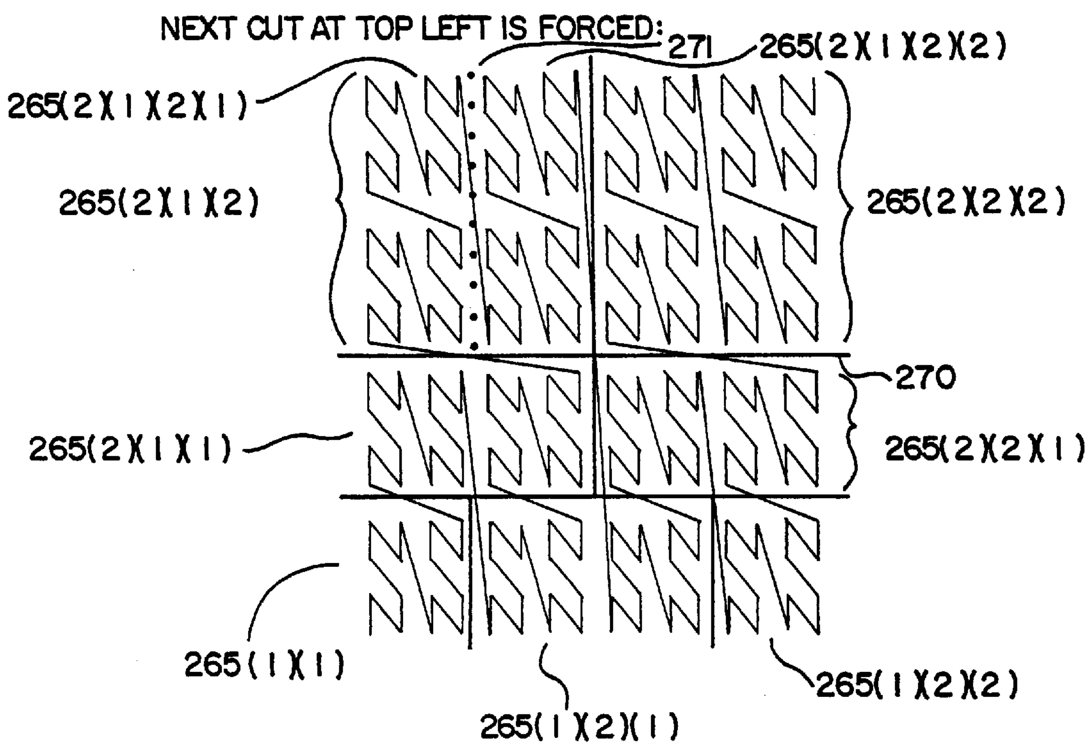

Referring to FIG. 8E, if the rectangular area 265(2) must be divided into smaller additional rectangles, there is only one location at which a division can be made, i.e. at the line 268. The rectangular area 265(2) is divided into rectangular areas 265(2)(1) and 265(2)(2), as shown in FIG. 8F. If the rectangular area 265(2)(1) must be further divided, there is only one possible dividing line 269, which meets the criteria. Using line 269, the rectangular area 265(2)(1) is divided into rectangular areas 265(2)(1)(1) and 265(2)(1)(2), as shown in FIG. 8G. Referring to FIG. 8G, if rectangular area 265(2)(2) must be divided, there is only one available dividing line 270. Using line 270, the rectangular area 265(2)(2) is divided into rectangular area 265(2)(2)(1) and rectangular area 265(2)(2)(2), as shown in FIG. 8H. If the rectangular area 265(2)(1)(2) must be further divided, there is only one dividing line 271 which meets the above criteria.

The above procedures are used to determine appropriate dividing lines for the formation of further sub-rectangular areas from which parcels can be formed when a type of data is more dense than a prior data type which has already been parcelized. When these new dividing lines are used, the parcels of the data type being formed from the sub-rectangular areas are ordered in accordance with their data entity ID's. For example, referring to FIG. 8H, the cartographic data parcels are ordered as follows: 265(1)(1), 265(1)(2)(1), 265(1)(2)(2), 265(2)(1)(1), 265(2)(1)(2),(1), 265(2)(1)(2),(2), 265(2)(2)(1), and 265(2)(2)(2).

(As mentioned above, in an alternative embodiment, the entities within a parcel can be arranged in an order other than Peano key order provided that the binary search tree property is maintained, i.e. the entity ID's are assigned so that there is at least one possible dividing line of the rectangle from which the routing layer 0 parcel was formed so that all the entity ID's on one side of the dividing line are less than all the entity ID's on the other side of the line. One alternative way in which this can be accomplished is by ordering all the entities within a parcel by latitude only (or longitude only). This ordering would allow a division of a rectangle from which a parcel was formed at locations in the one direction along the rectangle in which the entity ID's are ordered. This alternative has the disadvantage that if a further division of either of the resultant rectangles is necessary, it would likely also have to be made with a division line in the same direction as the division line which formed the rectangle thereby possibly resulting in rectangles of high aspect ratio.)

As mentioned above, some of the types of data may be layered. Each layer is treated as a separate type of data for purposes of parcelization. Accordingly, for higher layers of data, i.e. layers having fewer data entities in them, parcelization is performed on the data starting with a collection of all the data for the entire region that meet the criteria for inclusion in that layer. When parcelizing higher layers of a type of data, the same rectangle boundaries determined for the parcelization of layer 0 are used. Since higher layers of a type of data are less dense than layer 0 (which includes all the data entities of a type for all ranks), parcels may be formed by rectangles of a larger size.

V. Ordering of parcels

As the parcels are formed for all the types of data and for all the layers of each type, the parcels are ordered. Various types of ordering may be used. In general, it is preferred that the parcels be ordered in a manner that minimizes searches for data. In some of the functions in a navigation application program, there is sometimes a requirement to access data that represents features along routes or paths across parts of the geographic region. This may occur when calculating a route across the geographic region or when panning across the region. Sometimes these routes or paths extend over more than one of the rectangles from which the parcels of data were formed, Accordingly, starting with data in one parcel, there is a requirement for accessing the data in another parcel formed from a rectangle which is located adjacent to the rectangle from which the first parcel was formed. Since each rectangle may have several other rectangles adjacent to it, there is a need for ordering the parcels formed by the rectangles to minimize searches.

Figure 7:
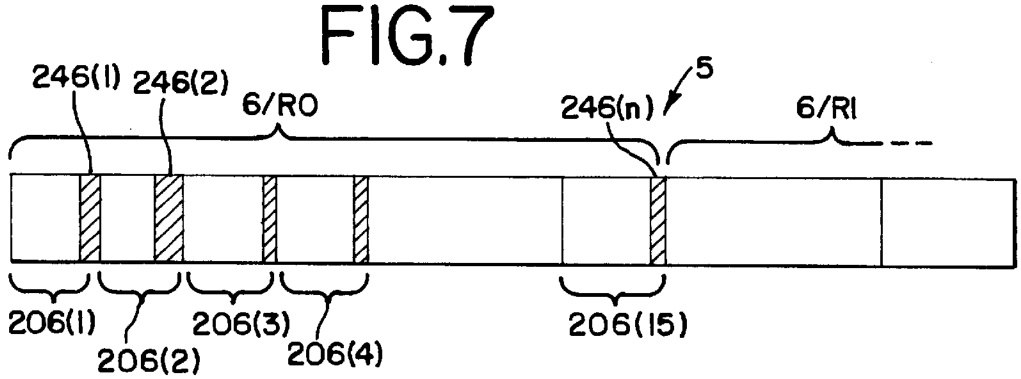
FIG. 7 is a diagram illustrating a data arrangement derived from the parcelization method shown in FIG. 6.

One way to order parcels is to use a depth-first ordering from the kd-tree index within each parcel type and layer. This provides an ordering similar to Peano-key ordering. Alternatively, Peano-key ordering may be used. Referring again to FIG. 6, each of these rectangles 204(1), 204(2), 204(3), 204(4), and so on, has been numbered. The parcels, 206(1), 206(2), 206(3), 206(4), and so on, formed by the rectangles 204(1), 204(2), 204(3), 204(4), are ordered similarly in the geographic database 5 (and/or on the medium), as shown in FIG. 7. To the extent that the data corresponding to features encompassed within any rectangle are less than the maximum parcel size, the remainder of the parcel is filled with padding, 246(1), 246(2) . . . 246(*n*), to make up the difference. (Padding may be used so that the size of the parcel conforms to the desired parcel size to facilitate memory management in a runtime parcel cache.) This ordering of the parcels, as shown, provides the advantage that in general when going from one rectangle to an adjacent rectangle, the distance that the head moves when reading data from the storage media when going from the parcel corresponding to the one rectangle to the parcel corresponding to the adjacent rectangle is minimized. This has the result of minimizing in general the seek time for finding the data in parcels that correspond to adjacent rectangles in the geographic region.

Essentially, the parcels are ordered in the order in which they are formed. This is in reverse order from which the divisions are made that are used to form the rectangles from which the parcels are made. (As noted above, for every division line made when forming rectangles, all data to west or south of the division line are formed into parcels before data to the east or north of division line.)

Each of the parcels so defined is assigned a "parcel ID." The parcel ID is a identification (e.g. a number) by which the parcel can be identified and it can be used to refer to the parcel when necessary to retrieve the parcel or any of the data contained therein. In a present embodiment, the parcel ID's are assigned to the parcels in the same order in which the parcels are formed and in the same ordered in which the parcels are ordered in the database. This has the advantage that, knowing the size of the parcels, the parcel ID can be chosen so as to be used as an offset from the beginning address of the database file to locate the position of the parcel on the media.

It is intended that the foregoing detailed description be regarded as illustrative rather than limiting and that it is understood that the following claims including all equivalents are intended to define the scope of the invention.

APPENDIX

```
Typedef struct
{
        double dFrom;
        double dTo;
} RangeFactorEntry;
typedef struct
{
        Ulong_t ulFrom;
        Ulong_t ulTo;
} RangeEntry;
PRIVATE RangeFactorEntry aTableFA[ ] = {
    { 0.900 ,    0.960 },
    {1,800 ,     1.920 },
    {2.700 ,     2.880 },
    {3.600 ,     3.840 },
    {4,500 ,     4.800},
    {5.400 ,     5.760},
    {6.300 ,     6.720},
    {7.200 ,     7.680},
    {8.100 ,     8.640 },
    {9.000 ,     9.600 },
    {9.900 ,     10.560 },
    {10.800 ,    11.520 },
    {11.700 ,    12.480 },
    {12.600,     13,440 },
    {13.500,     1000000000.000 },
};
PRIVATE RangeFactorEntry aTableFB[ ] = {
    { 0.860,     0.980 },
    { 1.720,     1.960 },
    { 2.580,     2.940 }.
    { 3.440,     3.920 },
    { 4.300,     4.900 },
    { 5.160,     5.880 },
    { 6.020,     6.860 },
    { 6.880,     1000000000.000 }
};
PRIVATE RangeFactorEntry aTableFC[ ] = {
    { 0.800 ,    1.000 },
    { 1.600 ,    2.000 },
    { 2.400 ,    3.000 },
    { 3.200 ,    1000000000.000 }
```

APPENDIX-continued

```
};
PRIVATE RangeFactorEntry aTableFA2[ ] = {
    { 0.450 ,    0.480 },
    { 0.900 ,    0.960 },
};
PRIVATE RangeFactorEntry aTableFB2[ ] = {
    { 0.430 ,    0.490 },
    { 0.860 ,    0.980 }
};
PRIVATE RangeFactorEntry aTableFC2[ ] ={
    { 0.100 ,    0.248 },
    { 0.400 ,    0.495 },
    { 0.800 ,    1.000 }
};
```

I claim:

1. A method of storing a plurality of records of geographic data on a storage medium, wherein each record represents a physical feature having a physical location in a geographic region, the method comprising the steps of separating said plurality of records into first and second groupings of records wherein the records in said first of said groupings represent physical features having geographic locations encompassed within a first rectangular area and the records in said second of said groupings represent physical features having geographic locations encompassed within a second rectangular area, wherein said first and said second rectangular areas are formed by a division at a position of a rectangular area that encompasses the locations of the physical features represented by the plurality of records in said first and second groupings, wherein said position of said division is determined by ranking trial divisions of said rectangular area; and selecting the position of said division by evaluating said ranking of said trial divisions.

2. The method of claim 1 wherein said ranking step further comprises:

comparing sizes of trial first and second groupings of records resulting from said trial divisions of said rectangular area; and assigning a ranking to each of said trial divisions based upon said comparing step.

3. The method of claim 2 wherein said comparing step further comprises:

comparing said sizes of said trial first and second groupings to a first plurality of ranges of sizes, and wherein said ranking assigned to each of said trial divisions is based upon said sizes of said trial first and second groupings of records having sizes within ranges of said first plurality of ranges of sizes.

4. The method of claim 3 wherein said first plurality of ranges of sizes is based upon a fill percentage of between 80 and 100 percent for a parcel formed of one of said groupings of records.

5. The method of claim 1 further comprising:

ascertaining an aspect ratio of at least one trial rectangle formed by each of said trial divisions; and wherein said selecting step is based upon evaluating both said aspect ratio and said ranking of each of said trial divisions.

6. The method of claim 2 wherein said comparing step further comprises:

comparing said sizes of trial first and second groupings to a first plurality of ranges of sizes and a second plurality of ranges of sizes;

assigning a first rating to each of said trial divisions based upon whether the first and second groupings of records produced by the trial division have sizes within said ranges in said first plurality of ranges of sizes and assigning a second rating to each of said trial divisions based upon whether the first and second groupings of records produced by the trial division have sizes within said ranges in said second plurality of ranges of sizes; and wherein said selecting step is further characterized as selecting the position of said division based upon a combination of said first and said second ratings for each trial division.

7. The method of claim 6 further comprising:

ascertaining an aspect ratio of at least one trial rectangle formed by each of said trial divisions; and selecting the position of said division based upon both said aspect ratio and said combination of said first and said second ratings for each trial division.

8. The method of claim 6 wherein said first plurality of ranges of sizes is based upon a desired fill percentage between 80 and 100 percent for a parcel formed of one of said groupings of records and said second plurality of ranges of sizes is based upon a fill percentage of between 84 and 96 percent for a parcel formed of one of said groupings of records.

9. The method of claim 6 wherein said first plurality of ranges of sizes is based upon a predetermined desired fill percentage for a parcel formed of one of said groupings of records and said second plurality of ranges of sizes is based upon an accuracy factor associated with an estimation of a size of said one of said groupings when formed into a parcel.

10. The method of claim 1 further comprising the step of:

forming one of said first and second groupings of records into a parcel upon evaluation of a size of said grouping not exceeding a predetermined desired maximum parcel size.

11. The method of claim 1 further comprising;

upon determining that a size of one of said first and second groupings formed by said separating step exceeds a predetermined threshold, separating said one grouping into further first and second groupings by applying the same separating step to said one grouping that had been applied to said plurality of records.

12. The method of claim 1 further comprising;

upon determining that a size of one of said first and second groupings formed by said separating step exceeds a predetermined threshold, continuing to apply said separating said one grouping and to all groupings formed therefrom until each of said groupings has a size that does not exceed a predetermined desired maximum parcel size.

13. The method of claim 1 wherein said ranking step further comprises:

comparing sizes of trial first and second groupings of records resulting from said trial divisions of said rectangular area to a first plurality of ranges of sizes; and and wherein, if said sizes of both said first and second groupings are less than a minimum parcel size, said selecting step is further characterized as selecting a division so that one of said groupings has a size in a range within a predetermined fill percentage of a fraction of said minimum parcel size, wherein the fraction is selected from a group consisting of: ½, ¼, and ⅛.

14. The method of claim 1 wherein said records represent segments of roads in geographic region.

15. The method of claim 14 wherein said records are routing data records that include information about speed of travel and turn restrictions along each of said segments.

16. The method of claim 14 wherein said records are cartographic data records that are used to display shapes of said segments of roads on a computer display.

17. The method of claim 1 further comprising the step of:

forming one of said first and second groupings of records into a parcel upon evaluation of a size of said grouping not exceeding a predetermined desired maximum parcel size, wherein said parcel size represents a minimum quantity of data that can be accessed by a navigation system in a single access operation.

18. The method of claim 17 wherein said forming step further comprises the step of:

when forming said one of first and second groupings of records into a parcel, adding an amount of padding to said grouping of records so that said grouping and said padding together are equal to the predetermined desired maximum parcel size.

19. A method of manufacturing a geographic database for a geographic region for use by a navigation application program, wherein said geographic database is stored on a computer-readable medium and wherein said geographic database includes a plurality of records wherein each record corresponds to a physical feature having a physical location in the geographic region, the method comprising the steps of:

arranging said records of geographic data into a plurality of parcels according to a method that stores in each parcel records of geographic data that represent features having physical locations in proximity to each other and wherein the records stored in any one parcel represent features having locations encompassed within a corresponding rectangular area associated therewith and located in said geographic region;

wherein a size and location of each rectangular area associated with a parcel is determined by a series of divisions of a rectangular area encompassing all of said features represented by said plurality of records, wherein each division of said series of divisions subsequent to an initial division is made on a rectangular area from the preceding division; and wherein each division of a rectangle area into further rectangular areas is made at a location of said rectangular area based upon an assessment of quantities of data that represent features encompassed by said rectangular area and each of said further rectangular areas, based upon a comparison of said quantities of data to a plurality of ranges of acceptable sizes derived from a desired fill percentage of parcels with data.

20. A geographic database stored on a computer readable medium where said database is formatted by the process of claim 1, 2, 3, 4, 5, 6, 7, 8, 9, 10, 11, 12, 13, 14, 15, 16, 17, 18, or 19.

* * * * *